US008885007B2

(12) United States Patent
Murphy (10) Patent No.: US 8,885,007 B2
(45) Date of Patent: Nov. 11, 2014

(54) METHOD AND SYSTEM FOR INITIATING COMMUNICATION VIA A COMMUNICATION NETWORK

(75) Inventor: William A. Murphy, Glace Bay (CA)

(73) Assignee: IWatchLife, Inc., Ottawa, Ontario (CA)

( * ) Notice: Subject to any disclaimer, the term of this patent is extended or adjusted under 35 U.S.C. 154(b) by 446 days.

(21) Appl. No.: 13/198,156

(22) Filed: Aug. 4, 2011

(65) Prior Publication Data
US 2012/0033027 A1  Feb. 9, 2012

Related U.S. Application Data

(60) Provisional application No. 61/370,509, filed on Aug. 4, 2010.

(51) Int. Cl.
*H04N 7/14*  (2006.01)

(52) U.S. Cl.
USPC .................................. 348/14.01; 455/456.1

(58) Field of Classification Search
USPC ........................................... 348/14.01–14.09
See application file for complete search history.

(56) References Cited

U.S. PATENT DOCUMENTS

| | | | |
|---|---|---|---|
| 6,166,729 A | 12/2000 | Acosta et al. |
| 6,195,117 B1 | 2/2001 | Miyazaki et al. |
| 6,462,785 B1 | 10/2002 | Carraro et al. |
| 6,831,675 B2 | 12/2004 | Shachar et al. |
| 6,879,998 B1 | 4/2005 | Raciborski et al. |
| 7,111,045 B2 | 9/2006 | Kato et al. |
| 7,382,244 B1 | 6/2008 | Donovan |
| 7,839,926 B1 | 11/2010 | Metzger et al. |
| 7,881,505 B2 | 2/2011 | Schneiderman et al. |
| 8,041,338 B2 | 10/2011 | Chen et al. |
| 8,139,817 B2 | 3/2012 | Laganiere et al. |
| 8,185,959 B2 | 5/2012 | Bellwood et al. |
| 8,290,999 B2 | 10/2012 | Shepherd et al. |
| 8,326,327 B2 | 12/2012 | Hymel et al. |
| 8,335,763 B2 | 12/2012 | Narayanan et al. |

(Continued)

FOREIGN PATENT DOCUMENTS

| | | |
|---|---|---|
| JP | 2004120178 A | 4/2004 |
| JP | 2004180290 A | 6/2004 |

(Continued)

OTHER PUBLICATIONS

Saptharish, M. et al., "An Information Value Driven Architecture for Urban Video Surveillance in Data and Attention Bandwidth Constrained Environments," Proceedings of the Sixth IEEE International Conference on Advanced Video and Signal Based Surveillance, pp. 122-127, Sep. 2-4, 2009.

*Primary Examiner* — Maria El-Zoobi
(74) *Attorney, Agent, or Firm* — The Noblitt Group, PLLC (57) ABSTRACT

A method of communicating between a first user and a second user comprises using a first system to transmit, from the first user, a first signal for delivery to the second user. In particular, the first signal is transmitted via a first communication application. At least one of video, audio, and image analytics of electronically sensed data is performed to determine a presence of the second user at a third system. When the second user is determined to be present at the third system, the second user is provided with a first indication indicative of the first signal, the first indication being provided via a pervasive communication application in execution on the third system and other than the first communication application.

19 Claims, 6 Drawing Sheets

(56) References Cited

U.S. PATENT DOCUMENTS

| | | |
|---|---|---|
| 8,396,246 B2 | 3/2013 | Anbalagan et al. |
| 8,433,136 B2 | 4/2013 | Epshtein et al. |
| 8,448,072 B1 | 5/2013 | Lai |
| 8,473,420 B2 | 6/2013 | Bohus |
| 2003/0025599 A1 | 2/2003 | Monroe |
| 2003/0070177 A1 | 4/2003 | Kondo et al. |
| 2003/0107648 A1 | 6/2003 | Stewart et al. |
| 2003/0167176 A1 | 9/2003 | Knudson et al. |
| 2003/0204856 A1 | 10/2003 | Buxton |
| 2004/0240546 A1 | 12/2004 | Wells |
| 2005/0169546 A1 | 8/2005 | Shin |
| 2005/0195823 A1 | 9/2005 | Chen et al. |
| 2005/0271250 A1 | 12/2005 | Vallone et al. |
| 2006/0053459 A1 | 3/2006 | Simerly et al. |
| 2006/0192698 A1 | 8/2006 | Morel |
| 2006/0195569 A1 | 8/2006 | Barker |
| 2006/0239645 A1 | 10/2006 | Curtner et al. |
| 2006/0271658 A1 | 11/2006 | Beliles |
| 2007/0013776 A1 | 1/2007 | Venetianer |
| 2007/0035632 A1 | 2/2007 | Silvernail et al. |
| 2007/0082700 A1 | 4/2007 | Landschaft et al. |
| 2007/0172155 A1 | 7/2007 | Guckenberger |
| 2007/0217765 A1 | 9/2007 | Itoh et al. |
| 2008/0108339 A1 | 5/2008 | Shaffer et al. |
| 2008/0129844 A1 | 6/2008 | Cusack et al. |
| 2008/0136908 A1 | 6/2008 | Carter |
| 2008/0166966 A1 | 7/2008 | Hamasaki et al. |
| 2008/0184245 A1 | 7/2008 | St-Jean |
| 2008/0235592 A1 | 9/2008 | Trauth |
| 2008/0243614 A1 | 10/2008 | Tu et al. |
| 2008/0258880 A1 | 10/2008 | Smith et al. |
| 2008/0270490 A1 | 10/2008 | Watterott et al. |
| 2008/0279481 A1 | 11/2008 | Ando |
| 2008/0304565 A1 | 12/2008 | Sakhardande et al. |
| 2009/0015671 A1 | 1/2009 | Addy |
| 2009/0021583 A1 | 1/2009 | Salgar et al. |
| 2009/0031381 A1 | 1/2009 | Cohen et al. |
| 2009/0122150 A1 | 5/2009 | Shabtay et al. |
| 2009/0141939 A1 | 6/2009 | Chambers |
| 2009/0141993 A1 | 6/2009 | Ma et al. |
| 2009/0174763 A1 | 7/2009 | Bengtsson et al. |
| 2009/0189981 A1 | 7/2009 | Siann et al. |
| 2009/0213245 A1 | 8/2009 | Harper et al. |
| 2009/0217343 A1 | 8/2009 | Bellwood |
| 2009/0219387 A1 | 9/2009 | Marman |
| 2009/0219411 A1 | 9/2009 | Marman et al. |
| 2009/0225164 A1 | 9/2009 | Renkis |
| 2009/0238542 A1 | 9/2009 | Adiletta et al. |
| 2009/0245573 A1 | 10/2009 | Saptharishi et al. |
| 2009/0324137 A1 | 12/2009 | Stallings et al. |
| 2010/0097471 A1 | 4/2010 | Drive et al. |
| 2010/0158315 A1 | 6/2010 | Martin |
| 2010/0177938 A1 | 7/2010 | Martinez et al. |
| 2010/0191827 A1 | 7/2010 | Martin |
| 2010/0231714 A1 | 9/2010 | Flores et al. |
| 2011/0022529 A1 | 1/2011 | Barsoba et al. |
| 2011/0092248 A1 | 4/2011 | Evanitsky |
| 2011/0109742 A1 | 5/2011 | Laganiere et al. |
| 2011/0112899 A1 | 5/2011 | Strutton et al. |
| 2011/0113461 A1 | 5/2011 | Laganiere et al. |
| 2011/0143728 A1 | 6/2011 | Holopainen |
| 2011/0211584 A1 | 9/2011 | Mahmoud |
| 2011/0211764 A1 | 9/2011 | Krupka |
| 2011/0267462 A1 | 11/2011 | Cheng |
| 2011/0273563 A1 | 11/2011 | Murphy |
| 2011/0314159 A1 | 12/2011 | Murphy |
| 2012/0015668 A1* | 1/2012 | Mgrdechian et al. ...... 455/456.1 |
| 2012/0033026 A1 | 2/2012 | Murphy |
| 2012/0033028 A1 | 2/2012 | Murphy |
| 2012/0033031 A1 | 2/2012 | Murphy |
| 2012/0036262 A1 | 2/2012 | Murphy |
| 2012/0098918 A1 | 4/2012 | Murphy |
| 2012/0129553 A1* | 5/2012 | Phillips et al. ............ 455/456.3 |
| 2012/0194676 A1 | 8/2012 | Laganiere et al. |
| 2012/0195363 A1 | 8/2012 | Laganiere et al. |
| 2012/0207349 A1 | 8/2012 | Murphy |
| 2012/0207356 A1 | 8/2012 | Murphy |
| 2014/0036073 A1 | 2/2014 | Black et al. |
| 2014/0036090 A1 | 2/2014 | Black |

FOREIGN PATENT DOCUMENTS

| | | |
|---|---|---|
| JP | 2006279464 A | 10/2006 |
| WO | WO 2005/004062 A2 | 1/2005 |
| WO | WO 2006/012384 A2 | 2/2006 |
| WO | WO 2008/092255 A1 | 8/2008 |
| WO | WO 2008/154003 A2 | 12/2008 |
| WO | WO 2009/111377 A1 | 9/2009 |

* cited by examiner

METHOD AND SYSTEM FOR INITIATING COMMUNICATION VIA A COMMUNICATION NETWORK

This application claims the benefit of U.S. Provisional Patent Application No. 61/370,509, filed on Aug. 4, 2010, the entire contents of which are incorporated herein by reference.

FIELD OF THE INVENTION

The instant invention relates generally to telecommunication methods and systems, and more particularly to a method and system for completing a communication request by a first user based on a sensed presence of a second user at a remote location.

BACKGROUND OF THE INVENTION

Telecommunication technologies allow two or more parties to communicate almost instantly, even over vast distances. In the early part of the last century, landline telephones became essentially ubiquitous in developed countries. More recently, cellular wireless telephone networks have emerged, allowing two or more parties to communicate with one another from virtually anywhere within a cellular network coverage area.

Videoconferencing has also emerged recently as a viable alternative to voice-only communication. A videoconference is a set of interactive telecommunication technologies, which allow two or more parties to interact via two-way video and audio transmissions simultaneously. Webcams are popular, relatively low cost devices that can provide live video streams via personal computers, and that can be used with a suitable software client for videoconferencing over the Internet.

Voice over Internet Protocol (VoIP) software clients, such as for instance Skype®, support voice-only and/or videoconferencing communication between two or more parties. During use, the VoIP application is in execution on a computer or on another suitable device that is associated with a first party. The VoIP application, and other similar applications, typically provides a list of user names associated with other parties, including an indication of the current status of each of the other parties. Accordingly, a first user can determine when another user is online for a Skype to Skype (VoIP) chat or call, unless the other user wishes to remain hidden. When a second party appears to be available, the first party may attempt to initiate a communication session with the second party. For instance, the first party selects from the list a user name associated with the second party, and then selects an option for initiating a "call" to the second user. The VoIP application that is in execution on a computer or on another suitable device associated with the second party causes an alert to be issued, such as for instance playing a "ringing" sound via a speaker of the computer or other suitable device. In response to the alert, the second party answers the "call" originating from the first party.

Unfortunately, it is not possible to initiate a communication session when the VoIP application is not in execution on the computer or other suitable device that is associated with the second party. In a prior art system, when the VoIP application is not in execution, the first party merely receives a message indicating that the second party is not available, and is invited to leave a voice message for the second party. Of course, the second party does not receive the voice message until the next time the VoIP application is launched. Often, by the time the second party receives the voice message the first party is no longer interested in establishing a communication session.

It would be advantageous to provide a method and system for making video calls that overcomes at least some of the above-mentioned limitations of the prior art.

SUMMARY OF EMBODIMENTS OF THE INVENTION

In accordance with an aspect of the invention there is provided a method of communicating between a first user and a second user, comprising: using a first system, transmitting from the first user a first signal for delivery to the second user via a first communication application; performing by a processor of a second system at least one of video, audio, and image analytics of electronically sensed data to determine a presence of the second user at a third system; and, when the second user is determined to be present at the third system, providing the second user with a first indication indicative of the first signal, the first indication provided via a pervasive communication application in execution on the third system and other than the first communication application.

According to another aspect, the invention provides for a method wherein the first signal is transmitted via a communication network between the first system and at least one of the second system and the third system.

According to another aspect, the invention provides for a method wherein the communication network is an Internet Protocol (IP) network.

According to another aspect, the invention provides for a method wherein the first indication is provided at the third system.

According to another aspect, the invention provides for a method wherein the electronically sensed data are sensed at a location of the third system.

According to another aspect, the invention provides for a method wherein the second system and the third system are a same system.

According to another aspect, the invention provides for a method wherein the at least one of video, audio, and image analytics comprises video analytics.

According to another aspect, the invention provides for a method wherein the at least one of video, audio, and image analytics comprises comparing the electronically sensed data with template data associated with the second user.

According to another aspect, the invention provides for a method wherein the template data comprises at least one of template voice data of the second user and facial image template data of the second user.

According to another aspect, the invention provides for a method wherein comparing comprises uniquely identifying the second user.

According to another aspect, the invention provides for a method wherein the at least one of video, audio, and image analytics comprises comparing sensed data with template data associated with each of a group of individuals to result in a 1 of N identification search.

According to another aspect, the invention provides for a method wherein N is less than 100.

According to another aspect, the invention provides for a method wherein N is less than 10.

According to another aspect, the invention provides for a method wherein the first signal comprises a message.

According to another aspect, the invention provides for a method wherein the first signal is for initiating a bidirectional communication between the first user and the second user.

According to another aspect, the invention provides for a method wherein the first communication application is one of an electronic mail (email) application, a social networking application, a Voice over Internet Protocol (VoIP) application and an instant messaging (IM) application.

In accordance with an aspect of the invention there is provided a method of communicating between a first user and a second user, comprising: associating the first user with a first system; associating the second user with a second system; using the first system, transmitting from the first user a first signal for delivery to the second user via a first communication application; using an electronic sensor, capturing at least one of video, audio and image data at a location of the second system; comparing the captured at least one of video, audio and image data with template data relating to the second user; and, in dependence upon identifying uniquely the second user based on determining a match between the template data and the at least one of video, audio and image data, providing to the second user a first indication indicative of the first signal, the first indication provided via a pervasive communication application in execution on the second system and that is other than the first communication application.

According to another aspect, the invention provides for a method wherein the communication network is an Internet Protocol (IP) network.

According to another aspect, the invention provides for a method wherein capturing comprises capturing video data, and wherein comparing comprises using a video analytics process to compare the captured video data with the template data relating to the second user.

According to another aspect, the invention provides for a method wherein capturing comprises capturing audio data, and wherein comparing comprises using an audio analytics process to compare the captured video data with the template data relating to the second user.

According to another aspect, the invention provides for a method wherein the second user is a known individual of a plurality of different individuals, and wherein the template data comprises template data associated with each one of the plurality of different individuals, to result in a 1 of N identification search.

According to another aspect, the invention provides for a method wherein N is less than 100.

According to another aspect, the invention provides for a method wherein N is less than 10.

According to another aspect, the invention provides for a method wherein the first signal comprises a message.

According to another aspect, the invention provides for a method wherein the first signal is for initiating a bidirectional communication between the user of the first system and the user of the second system.

According to another aspect, the invention provides for a method wherein the first communication application is one of an electronic mail (email) application, a social networking application, a Voice over Internet Protocol (VoIP) application and an instant messaging (IM) application.

According to another aspect, the invention provides for a method wherein comparing the captured at least one of video, audio and image data with template data relating to the second user is performed using at least a process in execution on a processor of the second user system.

According to another aspect, the invention provides for a method wherein comparing the captured at least one of video, audio and image data with template data relating to the second user is performed using at least a process in execution on a processor of the first user system.

According to another aspect, the invention provides for a method wherein comparing the captured at least one of video, audio and image data with template data relating to the second user is performed using at least a process in execution on a processor of at least a third system.

According to another aspect, the invention provides for a method wherein the at least a third system is a network server.

According to another aspect, the invention provides for a method wherein the network server is at least one of a video analytics server, an image analytics server and an audio analytics server.

According to another aspect, the invention provides for a method wherein the at least a third system comprises a plurality of other user systems, and wherein comparing the captured at least one of video, audio and image data with template data relating to the second user is accomplished according to a peer-to-peer protocol.

In accordance with an aspect of the invention there is provided a method of communicating between a first user and a second user, comprising: associating the first user with a first system; associating the second user with a second system; using a first communication application in execution on the first system, transmitting from the first user a first signal for delivery to the second user via a second communication application; capturing at least one of video, audio and image data at a location of the second system; performing at least one of video, audio, and image analytics to determine a presence of the second user at the location of the second system; and, when the second user is determined to be present at the location of the second system, providing the second user with a first indication indicative of the first signal, the first indication provided via a pervasive communication application in execution on the second system and that is other than the second communication application.

According to another aspect, the invention provides for a method wherein capturing is performed in dependence upon determining a failure to deliver the first signal to the second user via the second communication application.

According to another aspect, the invention provides for a method wherein capturing is performed in dependence upon determining that the second communication application is not in execution on the second system.

According to another aspect, the invention provides for a method wherein the at least one of video, audio and image analytics is performed using at least a process that is in execution on a processor of the second system.

According to another aspect, the invention provides for a method wherein the at least one of video, audio and image analytics is performed using at least a process that is in execution on a processor of the first user system.

According to another aspect, the invention provides for a method wherein the at least one of video, audio and image analytics is performed using at least a process that is in execution on a processor of a third system.

According to another aspect, the invention provides for a method wherein the third system is in communication with the second system via a communication network, and wherein the captured at least one of video, audio and image data is transmitted from the second system to the third system via the communication network.

According to another aspect, the invention provides for a method wherein the third system is a network server.

According to another aspect, the invention provides for a method wherein the network server is at least one of a video analytics server, an image analytics server and an audio analytics server.

According to another aspect, the invention provides for a method wherein the third system comprises a plurality of other user systems, and wherein performing the at least one of video analytics, image analytics and audio analytics is accomplished according to a peer-to-peer protocol.

According to another aspect, the invention provides for a method wherein the at least one of video, audio, and image analytics comprises comparing the captured at least one of video, audio and image data with template data associated with the second user.

According to another aspect, the invention provides for a method wherein comparing comprises uniquely identifying the second user.

According to another aspect, the invention provides for a method wherein the at least one of video, audio, and image analytics comprises comparing the captured at least one of video, audio and image data with template data associated with each of a group of individuals to result in a 1 of N identification search.

According to another aspect, the invention provides for a method wherein N is less than 100.

According to another aspect, the invention provides for a method wherein N is less than 10.

According to another aspect, the invention provides for a method wherein the first signal comprises a message.

According to another aspect, the invention provides for a method wherein the first signal is for initiating a bidirectional communication between the first user and the second user.

According to another aspect, the invention provides for a method wherein the second communication application is one of an electronic mail (email) application, a social networking application, a Voice over Internet Protocol (VoIP) application and an instant messaging (IM) application.

According to another aspect, the invention provides for a method wherein the first communication application and the second communication application are a same communication application.

In accordance with an aspect of the invention there is provided a system of communicating between a first user and a second user, comprising: associating the first user with a first system; associating the second user with a second system; using a first communication application that is in execution on the first system, transmitting from the first user a first signal for delivery to the second user via a second communication application; capturing at least one of video, audio and image data at a location of the second system; transmitting the captured at least one of video, audio and image data from the second system to a third system via a communication network; using the third system, performing at least one of video, audio, and image analytics to determine a presence of the second user at the location of the second system; and, when the second user is determined to be present at the second system, providing the second user with a first indication indicative of the first signal, the first indication provided via a pervasive communication application in execution on the second system and that is other than the second communication application.

According to another aspect, the invention provides for a method wherein capturing is performed in dependence upon determining a failure to deliver the first signal to the second user via the second communication application.

According to another aspect, the invention provides for a method wherein capturing is performed in dependence upon determining that the second communication application is not in execution on the second system.

According to another aspect, the invention provides for a method wherein the communication network is an Internet Protocol (IP) network.

According to another aspect, the invention provides for a method wherein the at least one of video, audio and image analytics comprises video analytics.

According to another aspect, the invention provides for a method wherein the at least one of video, audio, and image analytics comprises comparing the captured at least one of video, audio and image data with template data associated with the second user.

According to another aspect, the invention provides for a method wherein comparing comprises uniquely identifying the second user.

According to another aspect, the invention provides for a method wherein the at least one of video, audio, and image analytics comprises comparing the captured at least one of video, audio and image data with template data associated with each of a group of individuals to result in a 1 of N identification search.

According to another aspect, the invention provides for a method wherein N is less than 100.

According to another aspect, the invention provides for a method wherein N is less than 10.

According to another aspect, the invention provides for a method wherein the first signal comprises a message.

According to another aspect, the invention provides for a method wherein the first signal is for initiating a bidirectional communication between the first user and the second user.

According to another aspect, the invention provides for a method wherein the second communication application is one of an electronic mail (email) application, a social networking application, a Voice over Internet Protocol (VoIP) application and an instant messaging (IM) application.

According to another aspect, the invention provides for a method wherein the first communication application and the second communication application are a same communication application.

BRIEF DESCRIPTION OF THE DRAWINGS

Exemplary embodiments of the invention will now be described in conjunction with the following drawings, wherein similar reference numerals denote similar elements throughout the several views, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figures 1, 2:
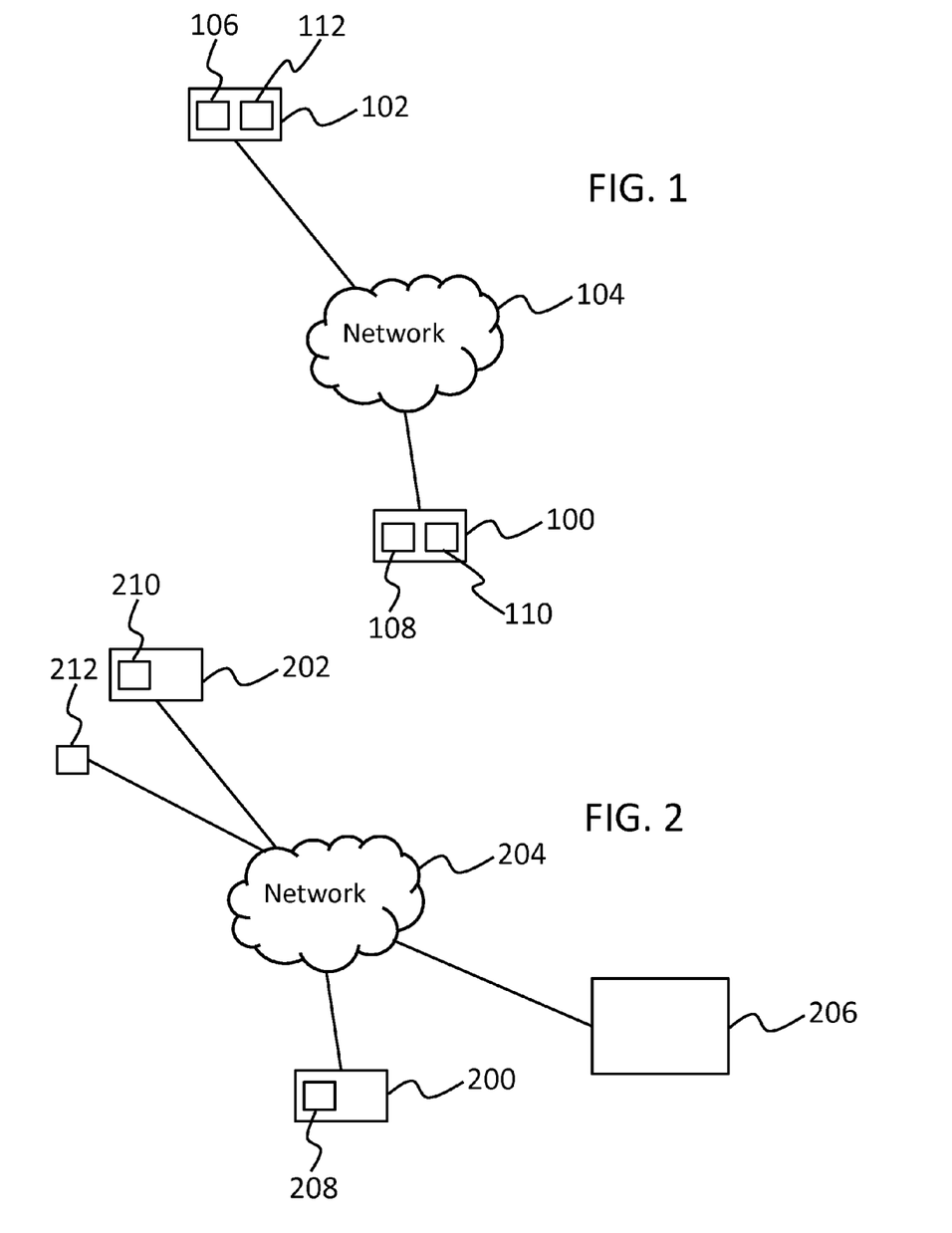
FIG. 1 is a simplified block diagram showing a system according to an embodiment of the instant invention.
FIG. 2 is a simplified block diagram showing another system according to an embodiment of the instant invention.

FIG. 1 is a simplified block diagram of a system according to an embodiment of the instant invention. A first user system 100 is provided in communication with a second user system 102, via a communication network 104. For instance, the communication network 104 is an Internet Protocol (IP) network. The first user system 100 is associated with a first user and the second user system 102 is associated with a second user. At least the second user system 102 comprises an electronic sensor 106 for sensing data within a sensing area of the second user system 102. For instance, the electronic sensor 106 is one of an audio sensor for sensing audio data and an image sensor for sensing image or video data. Optionally, the first user system 100 also comprises an electronic sensor 108 for sensing data within a sensing area of the first user system 100. Some specific and non-limiting examples of suitable image sensors include one of a web cam and an IP camera, either of which may be provided in communication with the second user system 102 or the first user system 100 via a USB port or via a wireless communication interface. Optionally, the image (or video) sensor is designed to operate in one or more of the visible and infra-red regions of the electromagnetic spectrum. Optionally, in order to support bidirectional audio and video communication between the first user and the second user, the first user system 100 and the second user system 102 each comprise both an audio sensor and a video sensor, as well as audio and video output devices, such as for instance a display screen and speakers, respectively. By way of a specific and non-limiting example, the first user system 100 and the second user system 102 each comprise a microphone and a web cam or another type of video camera. Optionally, one or both of the microphone and the web cam are external peripheral devices of the first and second user systems. Optionally, one or both of the microphone and the web cam are integrated devices of the first and second user systems.

The first user system 100 further comprises a processor 110 and the second user system 102 further comprises a processor 112, the processors 110 and 112 being for executing machine readable code for implementing at least one of an email application, a social networking application (such as Facebook®), a Voice over Internet Protocol (VoIP) application such as for instance Skype®, an instant messaging (IM) application, or another communication application. Furthermore, the processor of at least one of the first user system 100 and the second user system 102 is for analyzing data that are sensed using the sensor 106 of the second user system 102. In particular, the analysis comprises at least one of audio, image (such as based on a still image, or such as based on a frame or a set of frames of video data) and video analytics of the sensed data. More particularly, the analysis comprises comparing the sensed data with template data relating to the second user. For video data, an image database and search tools are employed for performing the analysis. Still more particularly, the second user is identified uniquely based on determining a match between the template data and the sensed data. Optionally, the electronic sensor 106 of the second user system 102 is an edge device that is capable of performing the at least one of audio, image and video analytics of the data that are sensed thereby.

During use, the first party uses a first software application in execution on the first user system 100 to initiate a communication session between the first party and the second party, via the communication network 104. For instance, the first party uses the Skype® software application or another similar Voice over Internet Protocol (VoIP) software client to select the second party from a list of usernames. A first signal is transmitted from the first system 100 for delivery to, or for initiating a communication session with, the second party via a second software application, such as for instance the Skype® software application or another similar VoIP software client.

When the second software application is not in execution on the second user system 102, then at least one of audio, image and video data is sensed within a sensing area of the sensor 106 of the second user system 102. For instance, by way of a specific and non-limiting example, video data is sensed within a field of view (FOV) of the sensor 106. The sensed video data, in the instant example, is analyzed subsequently in order to determine a presence of the second user at the second user system. Optionally, audio and/or image analytics of sensed audio and/or image data, respectively, is performed either in place of or in addition to the video analytics of sensed video data.

In one implementation, at least one of video, image and audio analytics of the sensed data is performed using at least a process in execution on the processor 112 of the second user system 102, or on a processor of the sensor 106 when said sensor 106 is an edge device that is capable of performing on-board analytics processing. The processing that is performed locally to the second user system 102 optionally is for detecting at least one of i) motion (relatively simple analytics), ii) the presence of a person (medium relative difficulty analytics), or iii) unique identification of a specific person (highest relative degree of difficulty). Optionally, the processing that is performed locally to the second user system 102 tracks a time property of the sensed data, such as for instance whether i) a specific person is passing by the second user system 102, or ii) the specific person is seated at the second user system 102, etc. Further optionally, the sensed data are partially analyzed locally to the second user system 102, such as for instance to detect motion or to detect a person, and the sensed data are subsequently transmitted to another system, such as for instance the first user system 100 to undergo an analytics process of higher relative difficulty, such as for instance identifying uniquely the second user based on the sensed data. Optionally, the higher relative difficulty analytics comprises determining facial characteristics of the sensed person, and/or comparing the sensed data to a database of known faces, etc.

In a second implementation, the sensed data is transmitted initially via the communication network 104 to the first user system 100 and at least one of video, image and audio analytics of the sensed data is performed using a video analytics process in execution on the processor 110 of the first user system 100.

Optionally, transmitting video data between the second user system 102 and the first user system 100, via communication network 104, comprises streaming the video data, or alternatively it comprises "trickling" individual non-adjacent frames of video data as is described in United States Provisional Patent Application 61/249,384 entitled "Video Analytics Method and System," the entire contents of which are incorporated herein by reference. Optionally, video analytics and/or audio analytics processing is distributed to a plurality of other first user systems, such as for instance user systems of a plurality of other Skype® users in a peer-to-peer approach When a result of the video analytics is indicative of the second user being present at the second user system 102, a first indication is provided to the second user via a pervasive communication application that is in execution on the second user system 102. The pervasive communication application is other than the second communication application, which during use is not in execution on the second user system. Accordingly, in the instant example the second user receives an indication via a software application other than the Skype® software application, informing the second user that the first user has attempted to establish a communication session. Optionally, the first indication prompts the second user to launch the second software application on the second user system. Some non-limiting examples of the applications other than Skype® include social networking applications (such as Facebook®, e-mail, gmail, instant messaging (IM), gtalk, AIM, MSN Messenger, etc.).

A specific example is provided in order to facilitate a better understanding of the operation of the system of FIG. 1. According to the example, the first user launches the Skype® software application on the first user system 100 and selects the second user from a list of contacts. The first user initiates a call to the second user by clicking on the "call" button within the Skype® user interface. Although the second user is present at a location of the second user system 102, the Skype® software application is not in execution on the second user system 102. Since the "call" cannot be connected as requested by the first user, a Skype® server of the communication network 104 provides a message to the first user via the Skype® software that is in execution on the first user system 100. Upon receiving the message from the Skype® server, a video analytics process in execution on the first user system 100 begins receiving captured video data from the second user system 102 via communication network 104. The video analytics process retrieves stored template data for the second user from a not illustrated memory device of the first user system, or from a memory device located at a centralized location. Based on a comparison of the captured video data with the template data, the second user is identified uniquely and is determined to be present at the location of the second user system 102. The first user system 100 provides an indication via a pervasive communication application that is in execution on the second user system 102, such as for instance a social networking application (such as Facebook®), e-mail, gmail, instant messaging (IM), gtalk, AIM, MSN Messenger, etc., the indication being indicative of the attempt by the first user to establish the Skype® call with the second user. Upon receiving the indication, the second user launches the Skype® software application on the second user system 102, logs in, and completes the Skype® call with the first user.

Optionally, instead of identifying the second user uniquely, video/image/audio analytics is performed to detect "a" person within a sensing area of the electronic sensor 106, after which a prompt is provided via the pervasive communication application requesting the detected person to provide a unique identification (such as speak a user name, password, employee number, etc.) or provide a biometric sample such as a voice sample or high-quality facial image. Unique identification of the detected person as the second user, in this implementation, is based on a combination of the result of relatively less difficult analytics processing and user identification data that is provided by the detected person.

FIG. 2 is a simplified block diagram of a system according to an embodiment of the instant invention. A first user system 200 is provided in communication with a second user system 202, via a communication network 204. For instance, the communication network 204 is an Internet Protocol (IP) network. A third system 206 is also in communication with at least one of the first user system 200 and the second user system 202 via the communication network 204. The first user system 200 is associated with a first user and the second user system 202 is associated with a second user. The first user system 200 comprises a processor 208 and the second user system 202 comprises a processor 210, the processors 208 and 210 are for executing machine readable code for implementing at least one of an email application, a social networking application (such as Facebook®), a Voice over Internet Protocol (VoIP) application such as for instance Skype®, an instant messaging (IM) application, or another communication application.

An electronic sensor 212 is co-located with the second user system 202. In the instant example, the electronic sensor is, for instance, a network (IP) camera capable of streaming video data to the third system 206 via the communication network 204, or it is a cellphone camera that provides data over a cell phone or Wi-Fi network, etc. Optionally, the image (or video) sensor is designed to operate in one or more of the visible and infra-red regions of the electromagnetic spectrum. In this example, the electronic sensor 212 is not in communication with the second user system 202. For instance, the electronic sensor 212 is a security camera that is dedicated to providing video data to the third system 206, which is for instance a video analytics server or a server farm having in execution thereon at least one video analytics process for performing video analytics of video data that is received from the electronic sensor 212. In one particular implementation, the electronic sensor 212 captures video data continuously and the video data is streamed to the third system 206 in response to receiving a request from the third system 206. Optionally, the electronic sensor 212 senses one or more of audio, image and video data, and uses that as a "trigger" to initiate data transfer. Optionally, one or more of audio, image and video analytics of the sensed data is performed. In another implementation, the electronic sensor 212 is an edge device that is capable of performing the one or more of audio, image and video analytics of the data that are sensed thereby. According to at least one implementation, analysis of the sensed data comprises comparing the sensed data with template data relating to the second user. More particularly, the second user is identified uniquely based on determining a match between the template data and the sensed data.

Optionally, the first user system 200 and the second user system 202 also comprise not illustrated audio and video sensors for supporting bidirectional audio and video communication between the first user and the second user, as well as audio and video output devices, such as for instance a display screen and speakers, respectively. By way of a specific and non-limiting example, the first user system 200 and the second user system 202 each comprise a microphone and a web cam or another type of video camera. Optionally, one or both of the microphone and the web cam are external peripheral devices of the first and second user systems. Optionally, one or both of the microphone and the web cam are integrated devices of the first and second user systems.

During use, the first party uses a first software application in execution on the first user system 200 to initiate a communication session between the first party and the second party, via the communication network 204. For instance, the first party uses the Skype® software application or another similar Voice over Internet Protocol (VoIP) software client to select the second party from a list of usernames. A first signal is transmitted from the first system 200 for delivery to, or for initiating a communication session with, the second party via a second software application, such as for instance the Skype® software application or another similar VoIP software client.

When the second software application is not in execution on the second user system 202, then at least one of audio, image and video data is sensed within a sensing area of the sensor 212 that is co-located with the second user system 202. For instance, by way of a specific and non-limiting example, video data is sensed within a field of view (FOV) of the sensor 212. The sensed video data, in the instant example, is analyzed subsequently in order to determine a presence of the second user at the second user system. Optionally, audio and/or image analytics of sensed audio and/or image data, respectively, is performed either in place of or in addition to performing video analytics of sensed video data. In particular, the sensed data is transmitted from the sensor 212 to the third system 206 via the communication network 204. At least one of video, image and audio analytics of the sensed data is then performed using at least a process in execution on the third system 206. The processing that is performed using the at least a process in execution on the processor of the third system 206 optionally is for detecting at least one of i) motion (relatively simple analytics), ii) the presence of a person (medium relative difficulty analytics), or iii) unique identification of a specific person (highest relative degree of difficulty). Optionally, the processing that is performed using the at least a process in execution on the processor of the third system 206 tracks a time property of the sensed data, such as for instance whether i) a specific person is passing by the second user system 202, or ii) the specific person is seated at the second user system 202, etc. Further optionally, the sensed data are partially analyzed locally to the second user system 202, such as for instance to detect motion or to detect a person, and the sensed data are subsequently transmitted to the third system 206 to undergo an analytics process of higher relative difficulty, such as for instance identifying uniquely the second user based on the sensed data. Optionally, the higher relative difficulty analytics comprises determining facial characteristics of the sensed person, and/or comparing the sensed data to a database of known faces, etc.

Optionally, transmitting video data between the second user system 202 and the third system 206, via communication network 204, comprises streaming the video data, or alternatively it comprises "trickling" individual non-adjacent frames of video data as is described in United States Provisional Patent Application 61/249,384 entitled "Video Analytics Method and System." Optionally, video analytics and/or audio analytics processing is distributed to a plurality of other first user systems, such as for instance user systems of a plurality of other Skype® users in a peer-to-peer approach.

When a result of the video analytics is indicative of the second user being present at the second user system, a first indication is provided to the second user via a pervasive communication application that is in execution on the second user system 202. The pervasive communication application is other than the second communication application, which during use is not in execution on the second user system 202. Accordingly, in the instant example the second user receives an indication via a software application other than the Skype® software application, informing the second user that the first user has attempted to establish a communication session. Optionally, the first indication prompts the second user to launch the second software application on the second user system 202. Some non-limiting examples of the applications other than Skype® include social networking applications (such as Facebook®, e-mail, gmail, instant messaging (IM), gtalk, AIM, MSN Messenger, etc.).

A specific example is provided in order to facilitate a better understanding of the operation of the system of FIG. 2. According to the example, the first user launches the Skype® software application on the first user system 200 and selects the second user from a list of contacts. The first user initiates a call to the second user by clicking on the "call" button within the Skype® user interface. Although the second user is present at a location of the second user system 202, the Skype® software application is not in execution on the second user system 202. Since the "call" cannot be connected as requested by the first user, a Skype® server of the communication network 204 provides a signal to the third system 206, the signal being indicative of a failure to complete the call. Upon receiving the signal from the Skype® server, a video analytics process in execution on the third system 206 begins receiving captured video data from the electronic sensor 212 that is co-located with the second user system 202 via communication network 204. The video analytics process retrieves stored template data for the second user from a not illustrated memory device of the third system 206. Based on a comparison of the captured video data with the template data, the second user is identified uniquely and is determined to be present at the location of the second user system 202. The third system 206 provides an indication via a pervasive communication application that is in execution on the second user system 202, such as for instance a social networking application (such as Facebook®, e-mail, gmail, instant messaging (IM), gtalk, AIM, MSN Messenger, etc., the indication being indicative of the attempt by the first user to establish the Skype® call with the second user. Upon receiving the indication, the second user launches the Skype® software application on the second user system 202, logs in, and completes the Skype® call with the first user.

Optionally, instead of identifying the second user uniquely, video/image/audio analytics is performed to detect "a" person within a sensing area of the electronic sensor 212, after which a prompt is provided via the pervasive communication application requesting the detected person to provide a unique identification (such as speak a user name, password, employee number, etc.) or provide a biometric sample such as a voice sample or high-quality facial image. Unique identification of the detected person as the second user, in this implementation, is based on a combination of the result of relatively less difficult analytics processing and user identification data that is provided by the detected person.

In the examples that are presented above, the first user attempts to initiate a communication session with the second user via a VoIP software application. Alternatively, the first user attempts to communicate with the second user via one of an email application, a social networking application, an instant messaging application or another communication application. When it is determined that the second user has not received the communication attempt, because a corresponding software application is not currently in execution on the second user system, then at least one of audio, image and video analytics of data that are sensed at a location of the second user system is performed to determine a presence of the second user at the second user system. When the second user is determined to be present, then an indication is provided to the second user via a pervasive communication application other than the corresponding software application. The indication informs the second user that the first user is attempting to communicate by one of email, a social networking application, instant messaging, VoIP, etc. Since the second user is identified uniquely based on sensed data, prior to the indication being provided, the indication is always provided to the intended recipient. In other words, the indication is not provided unless the second user is first identified at the second user system. In this way, users are not bothered by indications that are intended for other users.

Figure 3:
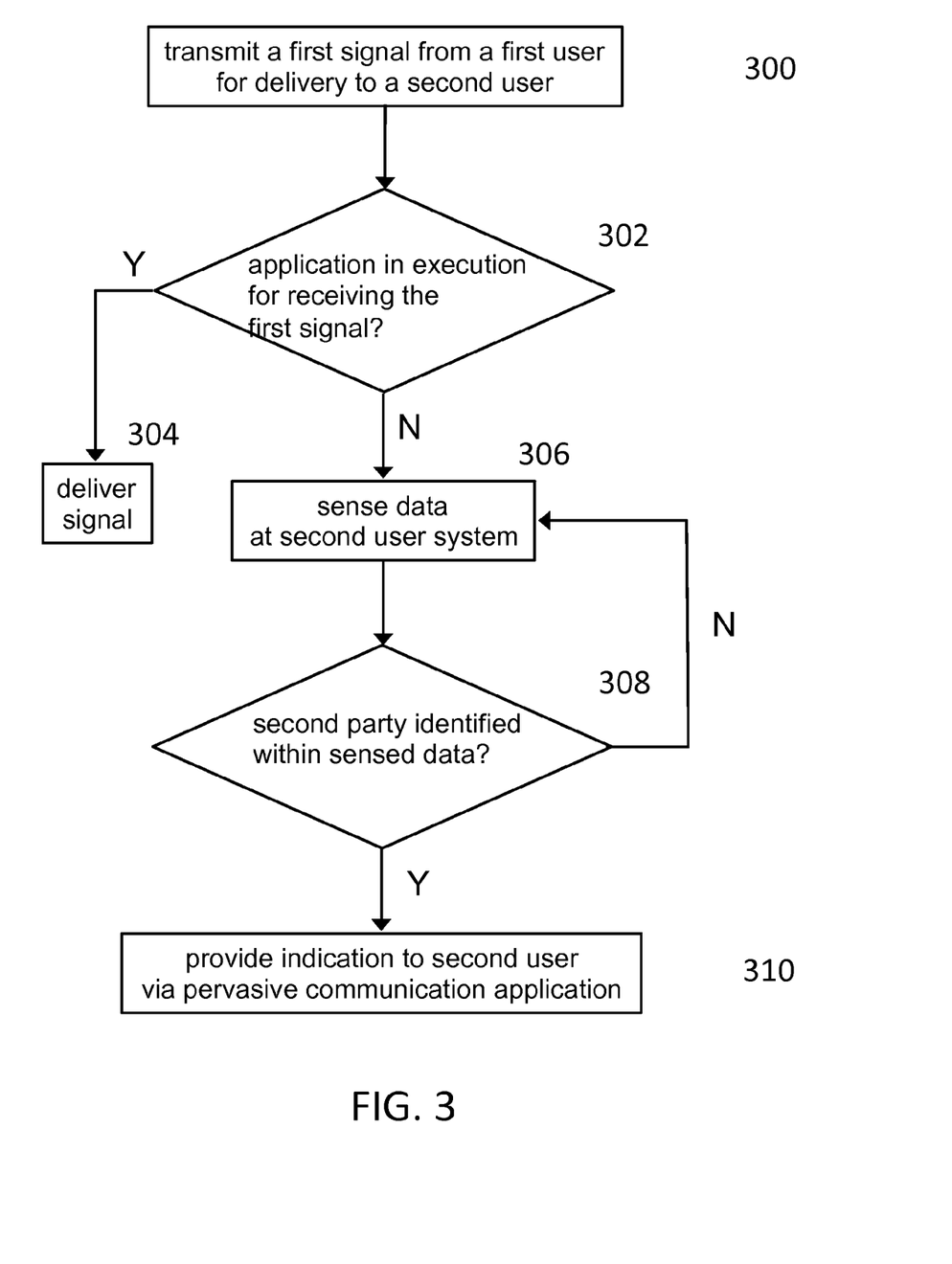
FIG. 3 is a simplified flow diagram of a method according to an embodiment of the instant invention.
Figure 4:
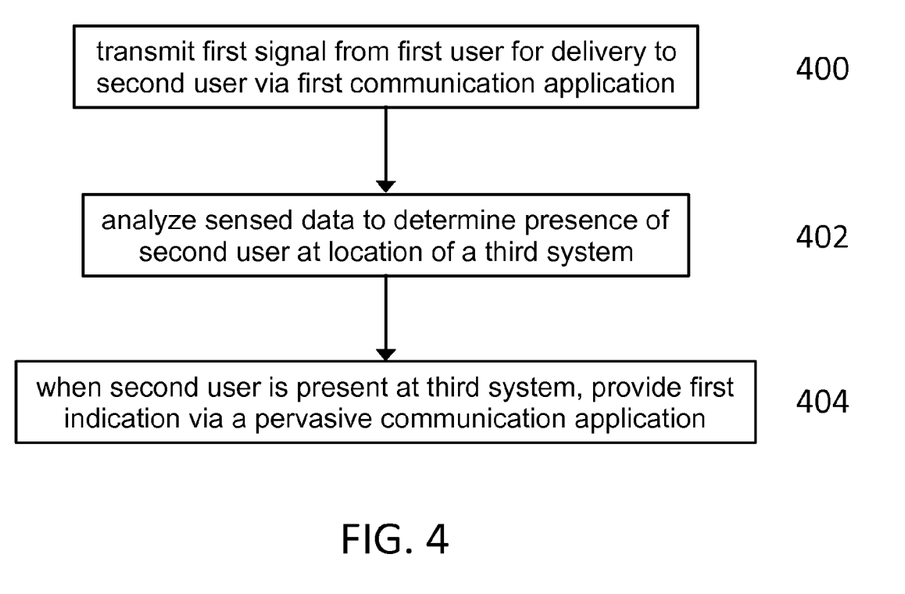
FIG. 4 is a simplified flow diagram of a method according to an embodiment of the instant invention.

Referring now to FIG. 3, shown is a simplified flow diagram of a method according to an embodiment of the instant invention. At 300, using a first system, a first signal is transmitted from a first user for delivery to a second user. In particular, the first signal is provided via a first communication application that is in execution on a first user system, for being delivered to the second user via a second communication application. At 302 it is determined whether or not the second communication application is in execution on a second user system that is associated with the second user. When it is determined at 302 that the second communication application is in execution on the second user system, then at 304 the first signal is provided to the second user via the second communication application. When it is determined at 302 that the second communication application is not in execution on the second user system, then at 306 at least one of audio, image and video data is sensed using an electronic sensor that is co-located with the second user system. For instance, a video camera is used to capture video data at a location of the second user system. At 308 it is determined whether or not the second party is identified within the sensed data. For instance, at least one of audio, image and video analytics of the sensed data is performed to identify the second user at the location of the second user system. When it is determined at 308 that the second party is not identified within the sensed data, then the method returns to 306 and additional data is sensed. When it is determined at 308 that the second party is identified within the captured image data, then at 310 an indication is provided to the second user via a pervasive communication application that is other than the second communication application. Optionally, the attempt to provide the indication to the second user is performed in a cascading manner. For instance, a first attempt is made to provide the indication via a social networking application (such as for instance Facebook®), followed by an attempt using Yahoo mail, followed by an attempt using America Online instant messaging, etc. As discussed above, identification of the second user may involve performing one or more of video, image and audio analytics. In addition, identification may be based on distributed analytics processes, such as for instance including analytics performed locally to the second user system, as well as analytics performed at the first user system or a third system (such as an analytics server, an analytics server farm or an analytics broker system). Further optionally, the at least one of video, image and audio analytics may be performed to merely detect motion or the presence of any person, followed by a prompt to the detected person to identify himself or herself Referring now to FIG. 4, shown is a method of communicating between a first user and a second user according to an embodiment of the instant invention. At 400, using a first system, a first signal is transmitted from the first user for delivery to the second user via a first communication application. At 402 a processor of a second system is used to perform at least one of video, audio, and image analytics of electronically sensed data, to determine a presence of the second user at a third system. At 404, when the second user is determined to be present at the third system, a first indication indicative of the first signal is provided to the second user, the first indication being provided via a pervasive communication application that is in execution on the third system, wherein the pervasive communication application is other than the first communication application. Optionally, the attempt to provide the indication to the second user via the pervasive communication application is performed in a cascading manner. For instance, a first attempt is made to provide the indication via a social networking application (such as for instance Facebook®), followed by an attempt using Yahoo mail, followed by an attempt using America Online instant messaging, etc.

In the method of FIG. 4, optionally the second system and the third system are a same system. In this case, the at least one of video, audio and image analytics is performed using the same system that is used to provide the first indication via the pervasive communication application. Alternatively, the second system and the third system are different systems, and the electronically sensed data is transmitted via a communication network from the location of the third system to the second system. For instance, the second system is a video analytics server or a video analytics server farm. Optionally, the second system performs "cloud" processing to provide video analytics services for a plurality of different third systems.

Figure 5:
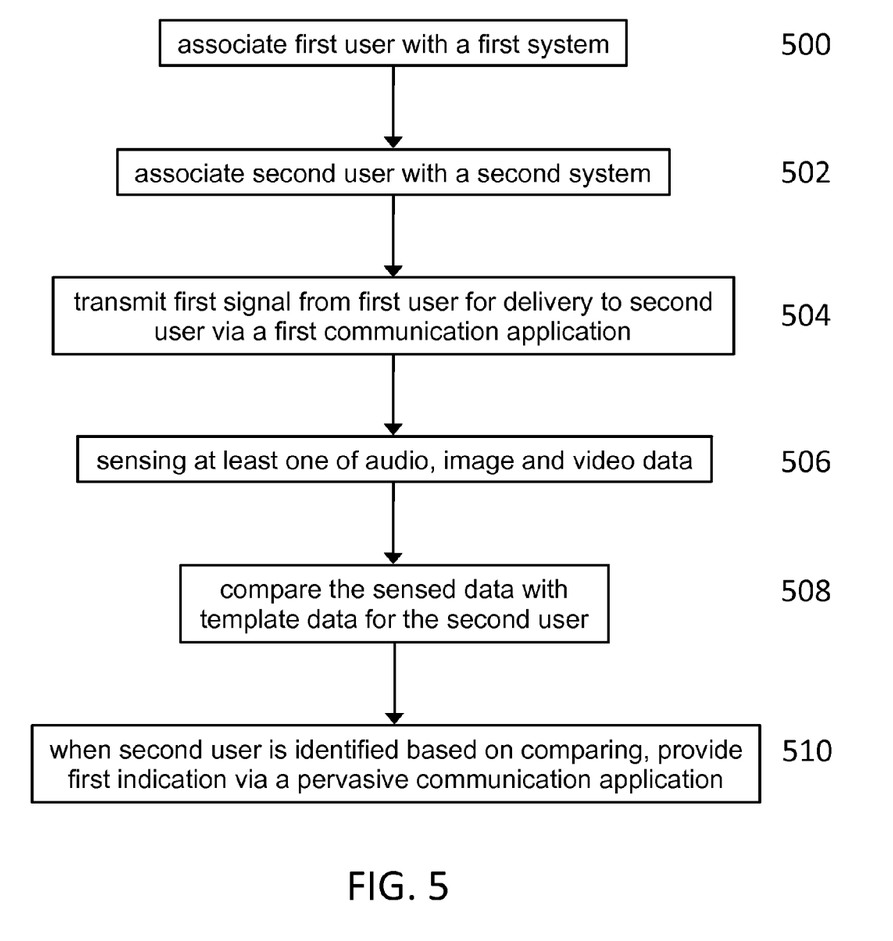
FIG. 5 is a simplified flow diagram of a method according to an embodiment of the instant invention.

Referring now to FIG. 5, shown is a method of communicating between a first user and a second user according to an embodiment of the instant invention. At 500 the first user is associated with a first system. At 502 the second user is associated with a second system. At 504, using the first system, a first signal is transmitted from the first user for delivery to the second user via a first communication application. At 506, using an electronic sensor, at least one of video, audio and image data is captured at a location of the second system. At 508 the captured at least one of video, audio and image data is compared with template data relating to the second user. At 510, in dependence upon identifying uniquely the second user based on determining a match between the template data and the at least one of video, audio and image data, a first indication indicative of the first signal is provided to the second user, the first indication being provided via a pervasive communication application that is in execution on the second system, wherein the pervasive communication application is other than the first communication application. Optionally, the attempt to provide the indication to the second user via the pervasive communication application is performed in a cascading manner. For instance, a first attempt is made to provide the indication via a social networking application (such as for instance Facebook®), followed by an attempt using Yahoo mail, followed by an attempt using America Online instant messaging, etc.

Figure 6:
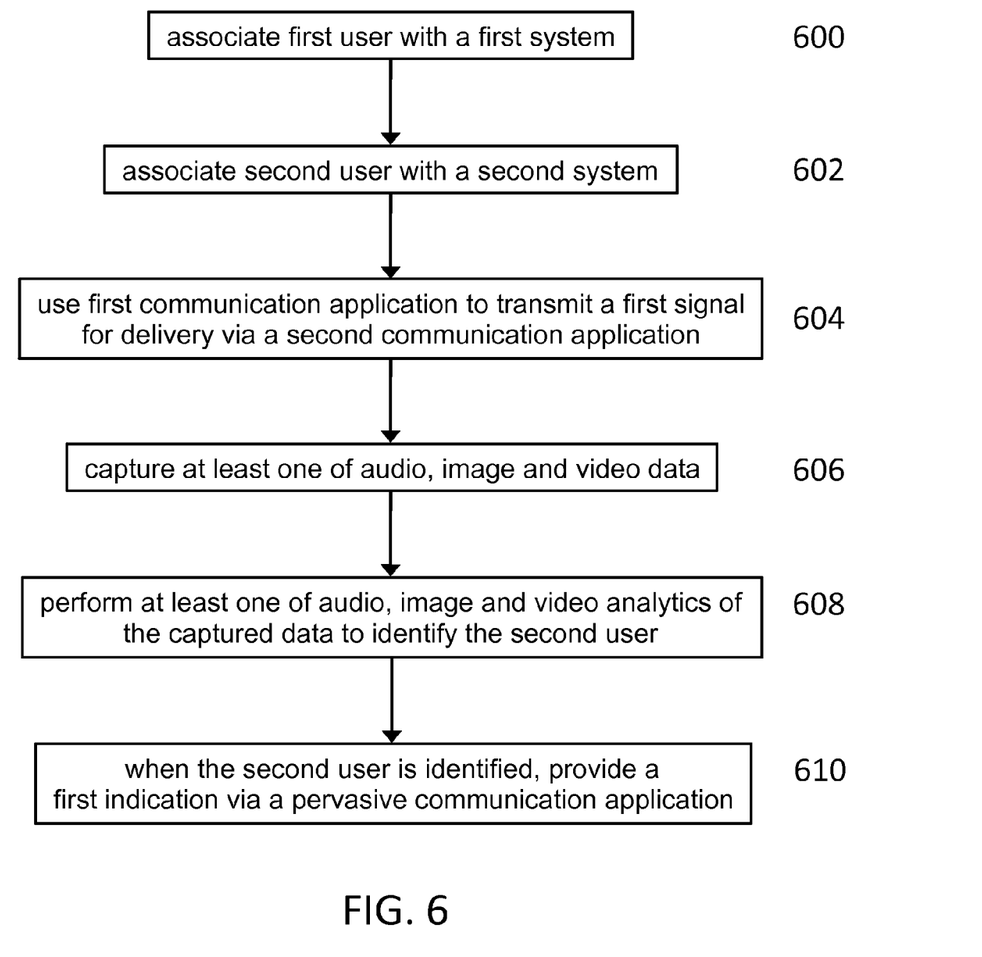
FIG. 6 is a simplified flow diagram of a method according to an embodiment of the instant invention; and, FIG. 7 is a simplified flow diagram of a method according to an embodiment of the instant invention.

Referring now to FIG. 6, shown is a method of communicating between a first user and a second user according to an embodiment of the instant invention. At 600 the first user is associated with a first system. At 602 the second user is associated with a second system. At 604, using a first communication application in execution on the first system, a first signal is transmitted from the first user for delivery to the second user via a second communication application. At 606 at least one of video, audio and image data is captured at a location of the second system. At 608 at least one of video, audio, and image analytics is performed to determine a presence of the second user at the location of the second system. At 610, when the second user is determined to be present at the location of the second system, a first indication indicative of the first signal is provided to the second user, the first indication being provided via a pervasive communication application in execution on the second system, wherein the pervasive communication application is other than the second communication application. Optionally, the attempt to provide the indication to the second user via the pervasive communication application is performed in a cascading manner. For instance, a first attempt is made to provide the indication via a social networking application (such as for instance Facebook®), followed by an attempt using Yahoo mail, followed by an attempt using America Online instant messaging, etc.

Figure 7:
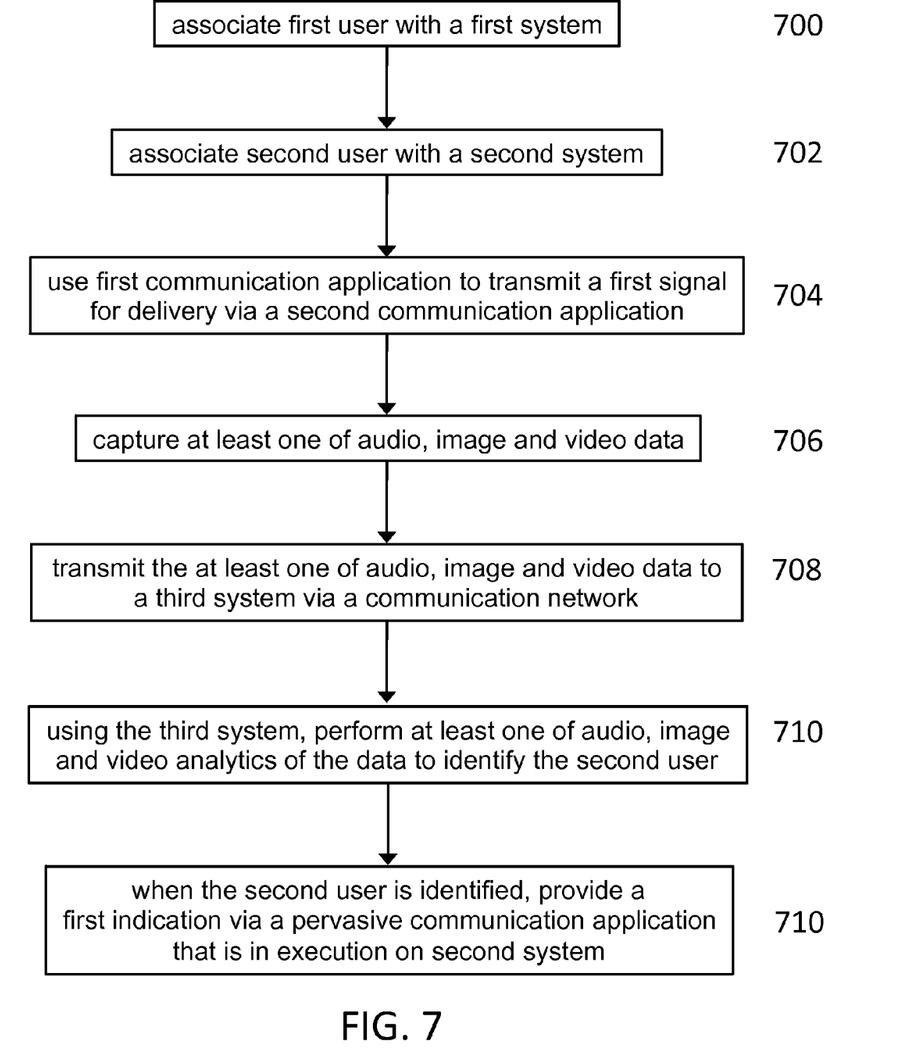

Referring now to FIG. 7, shown is a method of communicating between a first user and a second user according to an embodiment of the instant invention. At 700 the first user is associated with a first system. At 702 the second user is associated with a second system. At 704, using a first communication application that is in execution on the first system, a first signal is transmitted from the first user for delivery to the second user via a second communication application. At 706 at least one of video, audio and image data are captured at a location of the second system. At 708 the captured at least one of video, audio and image data are transmitted from the second system to a third system via a communication network. At 710, using the third system, at least one of video, audio, and image analytics of the at least one of video, audio and video data is performing to determine a presence of the second user at the location of the second system. At 712, when the second user is determined to be present at the second system, a first indication indicative of the first signal is provided to the second user, the first indication being provided via a pervasive communication application that is in execution on the second system, wherein the pervasive communication application is other than the second communication application. Optionally, the attempt to provide the indication to the second user via the pervasive communication application is performed in a cascading manner. For instance, a first attempt is made to provide the indication via a social networking application (such as for instance Facebook®), followed by an attempt using Yahoo mail, followed by an attempt using America Online instant messaging, etc.

According to the methods of FIGS. 3 to 7, at least one of video, audio, and image analytics of sensed data is performed to identify the second user uniquely. In one implementation, the sensed data is compared with template data associated with each of a group of individuals to result in a 1 of N identification search. Optionally, N is less than 100. Further optionally, N is less than 10.

Further, the first communication application typically, but not necessarily exclusively, is the same as or similar to the second communication application. For instance, in one implementation both of the first communication application and the second communication application is the Skype® software application. In another implementation, the first communication application is a first email application such as for instance "Mail" for the Mac OS X operating system, and the second communication application is a second email application such as for instance "Thunderbird" for the Mac OS X. Of course, alternatively both of the first communication application and the second communication application is the same email application, such as for instance "Mail" for the Mac OS X operating system. A person having ordinary skill in the art may readily envisage various other suitable combinations of the first and second communications applications.

Numerous other embodiments may be envisaged without departing from the scope of the invention.

What is claimed is:

1. A method of communicating between a first user and a second user, comprising:
using a first communication application that is in execution on a first system, transmitting from the first system by the first user a first signal for delivery to the second user via a second communication application;
delivering the first signal to the second user via the second communication application when the second communication application is in execution on a third system that is associated with the second user;
performing by a processor of a second system at least one of video, audio, and image analytics of electronically sensed data to determine a presence of the second user at the third system when the second communication application is other than in execution on the third system; and,
in dependence upon determining that the second user is present at the third system, based on a result of the at least one of video, audio, and image analytics, providing the second user with a first indication indicative of the first signal, the first indication provided via a pervasive communication application that is in execution on the third system and that is other than either of the first communication application or the second communication application.

2. A method according to claim wherein the first signal is transmitted via a communication network between the first system and at least one of the second system and the third system.

3. A method according to claim 2, wherein the communication network is an Internet Protocol (IP) network.

4. A method according to claim 1, wherein the first indication is provided at the third system.

5. A method according to claim 1, wherein the electronically sensed data are sensed at a location of the third system.

6. A method according to claim 1, wherein the second system and the third system are a same system.

7. A method according to claim 1, wherein the at least one of video, audio, and image analytics comprises video analytics.

8. A method according to claim 1, wherein the at least one of video, audio, and image analytics comprises comparing the electronically sensed data with template data associated with the second user.

9. A method according to claim 8, wherein the template data comprises at least one of template voice data of the second user and facial image template data of the second user.

10. A method according to claim 8, wherein comparing comprises uniquely identifying the second user.

11. A method of communicating between a first user and a second user, comprising:
associating the first user with a first system having a first processor for executing a first communication application;
associating the second user with a second system having a second processor for executing a second communication application;
using the first communication application in execution on the first system, transmitting from the first system to the second system via a communication network a first signal for delivery to the second user via the second communication application;
delivering the first signal to the second user via the second communication application when the second communication application is in execution on the second system;
using an electronic sensor, capturing at least one of video, audio and image data at a location of the second system when the second communication application is other than in execution on the second system;
comparing the captured at least one of video, audio and image data with template data relating to the second user; and,
in dependence upon identifying uniquely the second user based on determining a match between the template data and the at least one of video, audio and image data, providing to the second user a first indication indicative of the first signal, the first indication provided via a pervasive communication application that is in execution on the second system and that is other than either of the first communication application or the second communication application.

12. A method according to claim 11, wherein the communication network is an Internet Protocol (TP) network.

13. A method according to claim 11, wherein capturing comprises capturing video data, and wherein comparing comprises using a video analytics process to compare the captured video data with the template data relating to the second user.

14. A method according to claim 11, wherein capturing comprises capturing audio data, and wherein comparing comprises using an audio analytics process to compare the captured audio data with the template data relating to the second user.

15. A method according to claim 11, wherein comparing the captured at least one of video, audio and image data with template data relating to the second user is performed using at least a process in execution on the second processor.

16. A method according to claim 11, wherein comparing the captured at least one of video, audio and image data with template data relating to the second user is performed using at least a process in execution on the first processor.

17. A method according to claim 11, wherein comparing the captured at least one of video, audio and image data with template data relating to the second user is performed using at least a process in execution on a processor of at least a third system.

18. A method according to claim 17, wherein the at least a third system is a network server.

19. A method according to claim 17, wherein the at least a third system comprises a plurality of other user systems, and wherein comparing the captured at least one of video, audio and image data with template data relating to the second user is accomplished according to a peer-to-peer protocol.

* * * * *